US007894352B2

(12) United States Patent
Kompella et al.

(10) Patent No.: US 7,894,352 B2
(45) Date of Patent: *Feb. 22, 2011

(54) DETECTING DATA PLANE LIVELINESS OF A LABEL-SWITCHED PATH

(75) Inventors: Kireeti Kompella, Los Altos, CA (US); Ping Pan, Emerson, NJ (US); Nischal Sheth, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/329,708

(22) Filed: Dec. 8, 2008

(65) Prior Publication Data

US 2009/0086644 A1 Apr. 2, 2009

Related U.S. Application Data

(63) Continuation of application No. 10/365,598, filed on Feb. 12, 2003, now Pat. No. 7,463,591, which is a continuation-in-part of application No. 10/179,927, filed on Jun. 25, 2002, now Pat. No. 7,336,615.

(60) Provisional application No. 60/301,050, filed on Jun. 25, 2001, provisional application No. 60/360,786, filed on Feb. 28, 2002.

(51) Int. Cl.
*H04L 12/56* (2006.01)
(52) U.S. Cl. .................................. 370/248; 370/225
(58) Field of Classification Search .......... 370/227, 370/228, 242, 248, 351, 389, 225; 709/238, 709/239
See application file for complete search history.

(56) References Cited

U.S. PATENT DOCUMENTS 6,862,288 B2 * 3/2005 Sharma et al. .............. 370/403

(Continued)

OTHER PUBLICATIONS

Kompella, K., et al. "Detecting Multi-Protocol Label Switched (MPLS) Data Plane Failures," *Request for Comments*: 4379, (The Internet Society, Feb. 2006) pp. 1-47.

(Continued)

*Primary Examiner*—Pankaj Kumar
*Assistant Examiner*—Saba Tsegaye
(74) *Attorney, Agent, or Firm*—Straub & Pokotylo; John C. Pokotylo

(57) ABSTRACT

Detecting if a label-switched path (LSP) is functioning properly. To test that packets that belong to a particular Forwarding Equivalence Class (FEC) actually end their MPLS LSP on an label switching router (LSR) that is an egress for that FEC, a request message carrying information about the FEC whose LSP is being verified may be used. The request message may be forwarded like any other packet belonging to that FEC. A basic connectivity test as well as a fault isolation test are supported. In a basic connectivity test mode, the packet should reach the end of the LSP, at which point it is sent to the control plane of the egress LSR. The LSR then verifies that it is indeed an egress for the FEC. In a fault isolation test mode, the packet is sent to the control plane of each transit LSR, which performs various checks that it is indeed a transit LSR for the LSP. The transit LSR may also return further information that helps check the control plane against the data plane, i.e., that forwarding matches what the routing protocols determined as the path. A reliable return path is used for the reply.

19 Claims, 11 Drawing Sheets

U.S. PATENT DOCUMENTS

| | | | |
|---|---|---|---|
| 7,068,624 B1 * | 6/2006 | Dantu et al. | 370/331 |
| 7,336,615 B1 | 2/2008 | Pan et al. | |
| 2002/0004843 A1 * | 1/2002 | Andersson et al. | 709/238 |
| 2002/0093954 A1 * | 7/2002 | Weil et al. | 370/389 |
| 2002/0176415 A1 * | 11/2002 | Holden et al. | 370/389 |
| 2003/0063560 A1 | 4/2003 | Jenq et al. | |
| 2003/0112749 A1 * | 6/2003 | Hassink et al. | 370/225 |
| 2006/0095499 A1 * | 5/2006 | Luciani et al. | 709/201 |
| 2006/0198321 A1 | 9/2006 | Nadeau et al. | |
| 2008/0080507 A1 | 4/2008 | Swallow et al. | |

OTHER PUBLICATIONS

Awduche, D., et al. "RSVP-TE: Extensions to RSVP for LSP Tunnels," *Request for Comments*: 3209, sections 4.6.1.1 and 4.6.2.1, (Internet Engineering Task Force, Dec. 2001) pp. 1-57.

U.S. Appl. No. 11/848,780, filed Aug. 31, 2007, Bahadur and Kompella.

* cited by examiner

DETECTING DATA PLANE LIVELINESS OF A LABEL-SWITCHED PATH

§0. RELATED APPLICATIONS

This application is a continuation application of U.S. patent application Ser. No. 10/365,598 (referred to as "the '598 application"), titled "DETECTING DATA PLANE LIVELINESS OF A LABEL-SWITCHED PATH," filed on Feb. 12, 2003, listing Kireeti KOMPELLA, Ping PAN and Nischal SHETH as inventors, and scheduled to issue as U.S. Pat. No. 7,463,591 on Dec. 9, 2008, the '598 application (i) being a continuation-in-part of U.S. patent application Ser. No. 10/179,927, titled "DETECTING DATA PLANE LIVENESS IN CONNECTIONS SUCH AS LABEL-SWITCHED PATHS," filed on Jun. 25, 2002, listing Ping Pan and Nischal Sheth as inventors, which issued as U.S. Pat. No. 7,336,615 on Feb. 26, 2008, and which claims the benefit of Provisional Patent Application Ser. No. 60/301,050, titled "DETECTING DATA PLANE LIVELINESS IN RSVP-TE," filed on Jun. 25, 2001 and listing Ping Pan and Nischal Sheth as inventors; and (ii) claiming benefit to provisional patent application Ser. No. 60/360,786, titled "DETECTING DATA PLANE LIVELINESS IN MPLS", filed on Feb. 28, 2002 and listing Kireeti Kompella, Ping Pan and Nischal Sheth as the inventors, for any inventions disclosed in the manner provided by 35 U.S.C. §112, ¶ 1. Each of the utility and provisional applications is expressly incorporated herein by reference. However, the invention is not intended to be limited by any statements in those applications. Rather, those applications should be considered to describe exemplary embodiments of the invention.

Benefit is claimed under 35 U.S.C. §119(e)(1) to the filing date of provisional patent application Ser. No. 60/360,786, entitled "DETECTING DATA PLANE LIVELINESS IN MPLS", filed on Feb. 28, 2002 and listing Kireeti Kompella, Ping Pan and Nischal Sheth as the inventors, for any inventions disclosed in the manner provided by 35 U.S.C. §112, ¶ 1. This provisional application is expressly incorporated herein by reference. However, the invention is not intended to be limited by any statements in that provisional application. Rather, that provisional application should be considered to describe exemplary embodiments of the invention.

§1. BACKGROUND OF THE INVENTION

§1.1 Field of the Invention

The invention concerns detecting and diagnosing errors in connections, such as multi-protocol label switching (MPLS) label-switched paths (LSPs), that prevent user traffic from being delivered, or from being delivered in a reliable or timely manner.

§1.2 Description of Related Art

The description of art in this section is not, and should not be interpreted to be, an admission that such art is prior art.

Circuit-switched networks establish a connection between hosts (e.g., parties to a communication) for the duration of their communication or call. Because the circuit is kept up for the duration, bandwidth is wasted when data is not being transferred on the circuit. To avoid wasted bandwidth during times when no data is being transferred, packet-switched networks may be used. Packet-switched networks forward addressed data (referred to as "packets" in the specification below without loss of generality), typically on a best efforts basis, over shared links from a source to a destination. Packet-switched networks are made up of interconnected nodes (referred to as "routers" in the specification below without loss of generality). The routers may be geographically distributed throughout a region and connected by links (e.g., optical fiber, copper cable, wireless transmission channels, etc.). In such a network, each router typically interfaces with (e.g., terminates) multiple links.

Packets traverse the network by being forwarded from router to router until they reach their destinations (typically specified by layer-2 or layer-3 addresses in the packet headers). Unlike circuit switches which establish a connection for the duration of a call to send data received on a given input port out on a given output port, routers examine the destination addresses of received packets and, based on these destination addresses, determine the appropriate link on which to send them.

In some cases, it may be considered desirable to establish a fixed path through at least a part of a packet-switched network for at least some packets. For example, traffic engineering permits network administrators to map traffic flows onto an existing physical topology so that traffic flows can be moved away from congested paths to one or more less congested paths. Alternatively, paths can be determined autonomously, even on demand. Label-switching can be used to establish a fixed path from a head-end node (e.g., an ingress router) to a tail-end node (e.g., an egress router). The fixed path may be determined using known protocols. Once a path is determined, each router in the path may be configured (manually, or via some signaling mechanism) to forward packets to a peer (e.g., a "downstream" or "upstream" neighbor) router in the path. Routers in the path determine that a given set of packets (e.g., a flow) are to be sent over the fixed path, as opposed to being routed individually, based on unique labels added to the packets.

Another use of label-switching is to create "tunnels" through a network such that once a packet enters a tunnel, the packet is forwarded to the tunnel endpoints independent of the packet's original headers. Only the ingress router looks at the packet headers and determines which subset of packets get sent into which tunnels. Intermediate (also referred to as "transit") routers use just the labels to forward the packet. This is useful in many applications, such as Virtual Private Networks (VPNs) or Layer 2 circuits. Such tunnels may be point-to-point, point-to-multipoint, multipoint-to-point, or multipoint-to-multipoint.

The tunnel generated may be an LSP. More specifically, the operation of forwarding a packet, based on address information, to a next hop can be thought of as two steps-partitioning the entire set of possible packets into a set of forwarding equivalence classes (FECs), and mapping each FEC to a next hop. As far as the forwarding decision is concerned, different packets which get mapped to the same FEC are indistinguishable. With MPLS, a particular packet is assigned to a particular FEC just once, as the packet enters the label-switched domain. The FEC to which the packet is assigned is encoded as a label, typically a short, fixed length value. Thus, at subsequent nodes, no further header analysis is needed-all subsequent forwarding over the label-switched domain is driven by the labels. Such FECs may be generalized such that particular ports, wavelengths, time slots, channels, etc. are used instead of, or encoded by, labels.

"Failures" in a Label-Switched Path

Unfortunately, forwarding information (such as an "OUT" label) of the forwarding component of label-switching routers (LSRs) may become corrupted. Consequently, data leaving such an LSR will be "black-holed" or mis-routed. When a next LSR in the LSP receives the packet with the wrong label, it will either discard it or transmit the packet along an LSP other than the desired LSP.

Since the control plane of routers may use Internet protocol (IP) addresses to route its messages, the control plane will likely still be active and therefore might not recognize the error. Consequently, an ingress LSR may continue to transmit data through the non-functioning LSP.

If an ingress LSR continuously fails to deliver data through a given LSP, that LSP may be suspected of being down. It is desirable to be able to detect, within a reasonable amount of time, if a suspected LSP is actually down. In the art, there is no practical and quick solution known to detect the liveliness of the data plane of an LSP. Presently, if an LSP is suspected of being down, users perform manual memory dumps along several LSPs, examining the labeling information of the control plane and the data plane of the LSPs, to discover which LSP was not functioning properly. This procedure can be very time consuming and may not be a practical solution because of the length of time needed to locate the problem. It may also be desirable to monitor an LSP before it is even suspected of being down.

§2. SUMMARY OF THE INVENTION

The present invention discloses apparatus, data structures and/or methods for detecting if a suspected LSP is actually down. To test that packets that belong to a particular FEC actually end up on an egress LSR for the LSP associated with that FEC, the present invention may use an MPLS connectivity request message carrying information about the FEC whose LSP is being verified. In one embodiment, this connectivity request message is forwarded just like any other packet belonging to the FEC. The present invention may support two test modes: basic connectivity checks, as well as fault isolation. In a "ping" (basic connectivity test) mode, the packet should reach the end of the path, at which point it is sent to the control plane of the egress LSR. The egress LSR then verifies that it is indeed an egress for the LSP. In a "trace_route" (fault isolation test) mode, the packet is sent to the control plane of each transit LSR, which performs various checks that it is indeed a transit LSR for the LSP. The transit LSR may also return further information that helps check the control plane against the data plane, i.e., that forwarding data structures and operation match what the routing protocols determined as the path.

In one embodiment, the connectivity of an LSP is tested periodically. If the connectivity test fails, a fault isolation test of the LSP can then be initiated to determine where the fault lies. Alternatively, fault isolation tests of an LSP may be performed periodically to verify that forwarding matches the control plane. However, this alternative places a greater burden on transit LSRs and therefore should be used judiciously.

Replies should be sent back to the origin of the request (typically the ingress LSR) over a path deemed reliable.

A FEC may have more than one LSP. Accordingly, the principles of the present invention may be used to test a particular LSP, or to test a FEC which may have more than one associated LSP.

§3. BRIEF DESCRIPTION OF THE DRAWINGS

§4. DETAILED DESCRIPTION

The invention disclosed herein involves methods, apparatus and/or data structures for detecting and optionally isolating data plane failures in LSPs, such as MPLS LSPs. The following description is presented to enable one skilled in the art to make and use the invention, and is provided in the context of particular applications and their requirements. Various modifications to the disclosed embodiments will be apparent to those skilled in the art, and the general principles set forth below may be applied to other embodiments and applications. Thus, the principles of the invention are not limited to the embodiments shown, and the inventors regard their invention as the following disclosed methods, apparatus and data structures and any other patentable subject matter.

In the invention, the concept of "labels" is not limited to the 20-bit labels normally associated with LSPs, and may be used more generally to differentiate wavelength-switched paths, channel-switched paths, time-slot-switched paths, an asynchronous transfer mode (ATM) virtual circuit path, or any other type of generalized MPLS path.

In the following, exemplary environments in which the principles of the invention may operate are described in §4.1. Then high-level functions that may be performed consistent with principles of the invention are introduced in §4.2. In §4.3, exemplary operations are introduced. Then, apparatus, methods and data structures that may be used consistent with principles of the invention are described in §4.4. Finally, some conclusions regarding the invention are set forth in §4.5.

§4.1 Environment in which the Invention May Operate

The principles of the invention may be used in communication systems including nodes for forwarding addressed data, such as packets, and having a control component and a forwarding component. The invention may be initiated by the control component of the ingress node of an LSP. The node may be an LSR.

§4.1.1 Operations of LSPs

Figure 1:
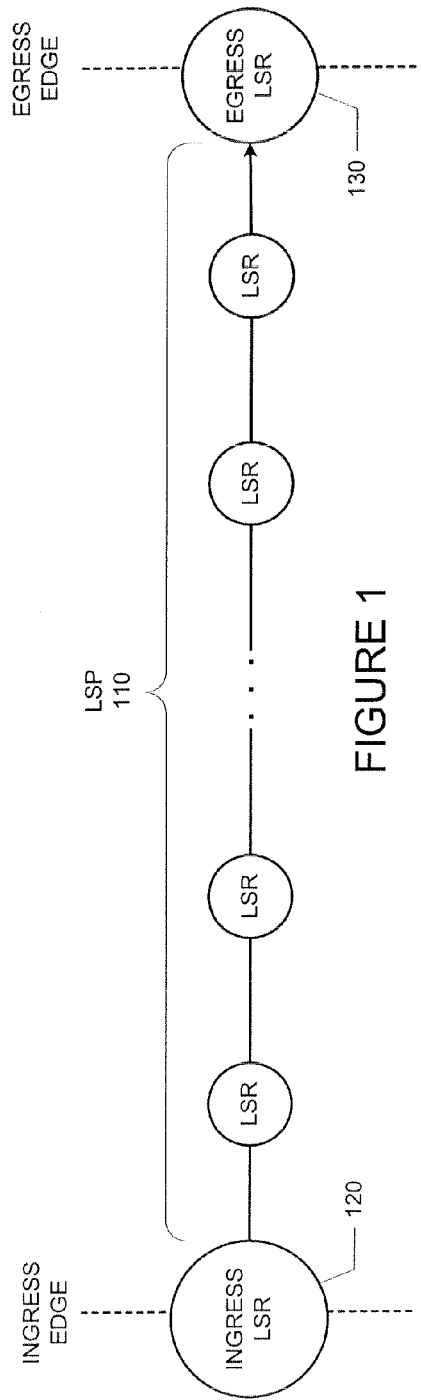
FIG. 1 illustrates an LSP including an ingress LSR, transit LSRs, and an egress LSR.

FIG. 1 illustrates an LSP 110 across a network. Notice that the paths making up LSP 110 are simplex—traffic flows in one direction from one or more ingress LSRs, such as LSR 120 at an ingress edge, to one or more egress LSRs, such as LSR 130 at an egress edge. Generally, duplex traffic requires two LSPs—one for each direction. However, some protocols support bi-directional LSPs. An LSP may be defined by the concatenation of one or more label-switched hops, allowing a packet to be forwarded from one LSR to another across the MPLS domain defined by LSP 110.

Figure 2:
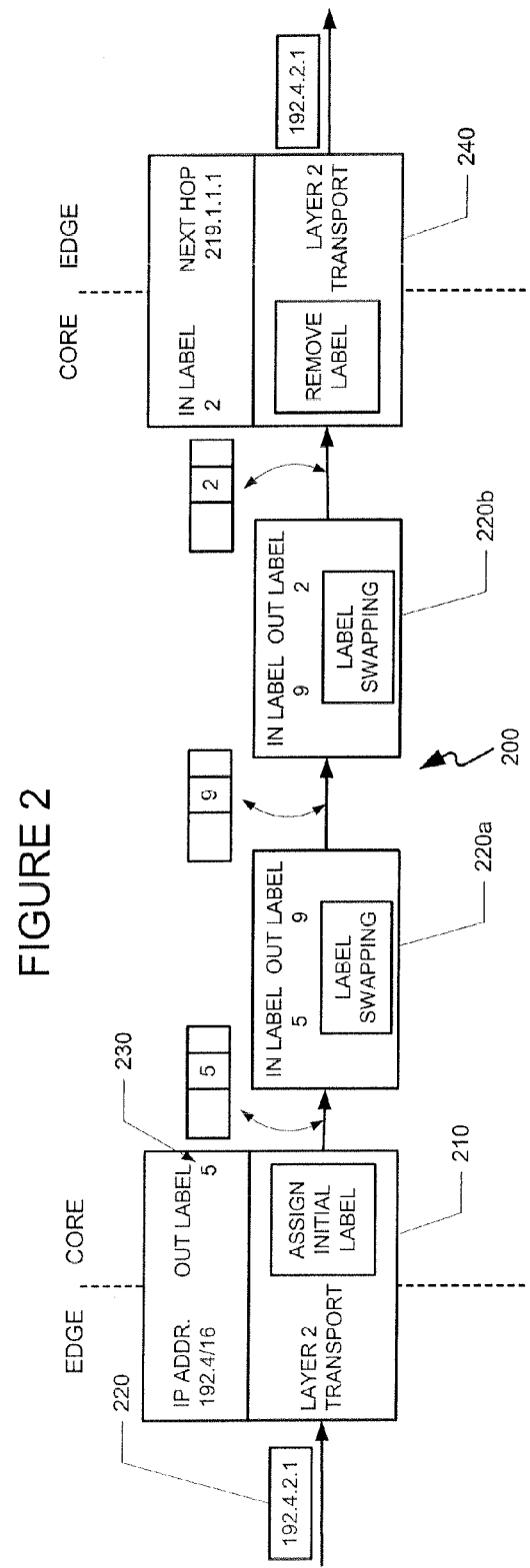
FIG. 2 illustrates label assignment, switching and popping by LSRs of an LSP.

FIG. 2 illustrates an example of how an LSP works. Recall that a label may be a short, fixed-length value which may be carried in the packet's header and identify a FEC. Recall further that a FEC is a set of packets that are forwarded over the same path through a network, sometimes even if their ultimate destinations are different. At the ingress edge of the network, each packet may be assigned an initial label (e.g., based on all or a part of its layer 3 destination address). More specifically, in the example illustrated in FIG. 2, an ingress LSR 210 interprets a destination address 220 of an unlabeled packet, performs a longest-match routing table lookup, maps the packet to an FEC, assigns a label 230 to the packet based on the FEC, and forwards it to the next hop in the LSP. More generally, FEC classification may be based on the input port, input interface, various fields of the layer 2 header, various fields of the layer 3 header, or some combination of these.

In the MPLS domain, LSRs 220 ignore the packet's network layer header and simply forward the packet using label-swapping. More specifically, when a labeled packet arrives at an LSR, the input port number and the label are used as lookup keys into an MPLS forwarding table. When a match is found, the forwarding component retrieves the associated outgoing label, the outgoing interface (or port), and the next hop address from the forwarding table. The incoming label is replaced with the outgoing label and the packet is directed to the outgoing interface for transmission to the next hop in the LSP. FIG. 2 illustrates such label-switching by LSRs 220a and 220b.

When the labeled packet arrives at egress LSR 240, if the next hop is not an LSR, egress LSR 240 discards (pops) the label and forwards the packet. This forwarding may be determined by the label received by egress LSR 240, or it may be based on conventional (e.g., longest-match IP) forwarding. Alternatively, label popping can be performed by the penultimate router of the LSP.

§4.1.2 Establishing LSPs

In the example illustrated in FIG. 2, each LSR had appropriate forwarding labels. These labels may be provided to the LSR in several ways.

There are two basic types of LSPs—static LSPs and protocol (e.g., label distribution protocol (LDP), resource reservation protocol (RSVP), border gateway protocol (BGP)) signaled LSPs. Although each type of LSP is known to those skilled in the art, each is introduced below for the reader's convenience.

With static LSPs, labels are assigned manually, by means of provisioning tools on all LSRs involved in the LSP, or some combination of these. No signaling operations by the nodes are needed.

With RSVP signaled LSPs, an ingress LSR is configured. The ingress LSR uses configuration information to determine the path (e.g., explicit path, path constraint, or both). The egress and transit LSRs accept signaling information from the ingress LSR. Therefore, the LSRs of the LSP set up and maintain the LSP cooperatively through the use of path signaling messages such as PATH messages and RESV messages.

PATH messages are sent from the ingress LSR to the egress LSR and follow the path of the LSP. RESV messages originate from the egress LSR, and are delivered hop-by-hop back towards the ingress LSR. As a PATH message travels the path of an LSP, it takes the IP address of the LSR it was transmitted from and stores it in the LSR to which it is sent. This "IP trail" left by the PATH message is used by RESV messages to return back through the LSP path. Any errors encountered when establishing and maintaining an LSP are reported back to the ingress LSR.

Signaling of LSPs via Constraint-based Routed Label Distribution Protocol (CR-LDP) is very similar to signaling via RSVP, both in the configuration of the LSPs and the operation of the protocol.

With LDP-signaled LSPs, LSRs establish LSPs through a network by mapping network-layer routing information directly to data link layer-switched paths. LDP operates in a hop-by-hop fashion as opposed to RSVP's end-to-end fashion. More specifically, LDP associates a set of destinations (route prefixes and router addresses) with each data link LSP. This set of destinations are considered a FEC. These destinations all share a common data link layer-switched path egress and a common unicast routing path. Each router chooses the label advertised (e.g., in a label mapping message) by the next hop for the FEC and splices it to the label it advertises to all other LSRs. This forms a tree of LSPs that converge on the egress LSR.

BGP may be used to signal a label associated with an interior gateway protocol-version 4 ("IGPv4"), or IGPv6 prefix. Such a prefix may be carried in a BGP network layer reachability information (NLRI) message used to exchange labels (e.g., for VPNs). For example, consider an LSP between node 1 and node 2 in autonomous system (AS) 1, and an LSP between node 3 and node 4 in AS 2. The two LSPs could be "stitched together" across the two ASs using a BGP session between node 2 and node 3.

An LSP may be considered to have two planes, a control plane and a data plane. In an RSVP-signaled LSP, the PATH and RESV messages that are used to set up and maintain the LSP are transmitted on the control plane using IP addresses, and user traffic is transmitted on the data plane using labels. Similarly, in an LDP-signaled LSP, the label mapping messages that are used to set up the LSP are transmitted on the control plane using IP addresses, and user traffic is transmitted on the data plane using labels. Finally, in a BGP-signaled LSP, network layer reachability information ("NLRI") messages are transmitted on the control plane using IP addresses and user traffic is transmitted on the data plane using labels. In some cases, the control plane and the data plane run over physically or logically separate networks.

Figure 3:
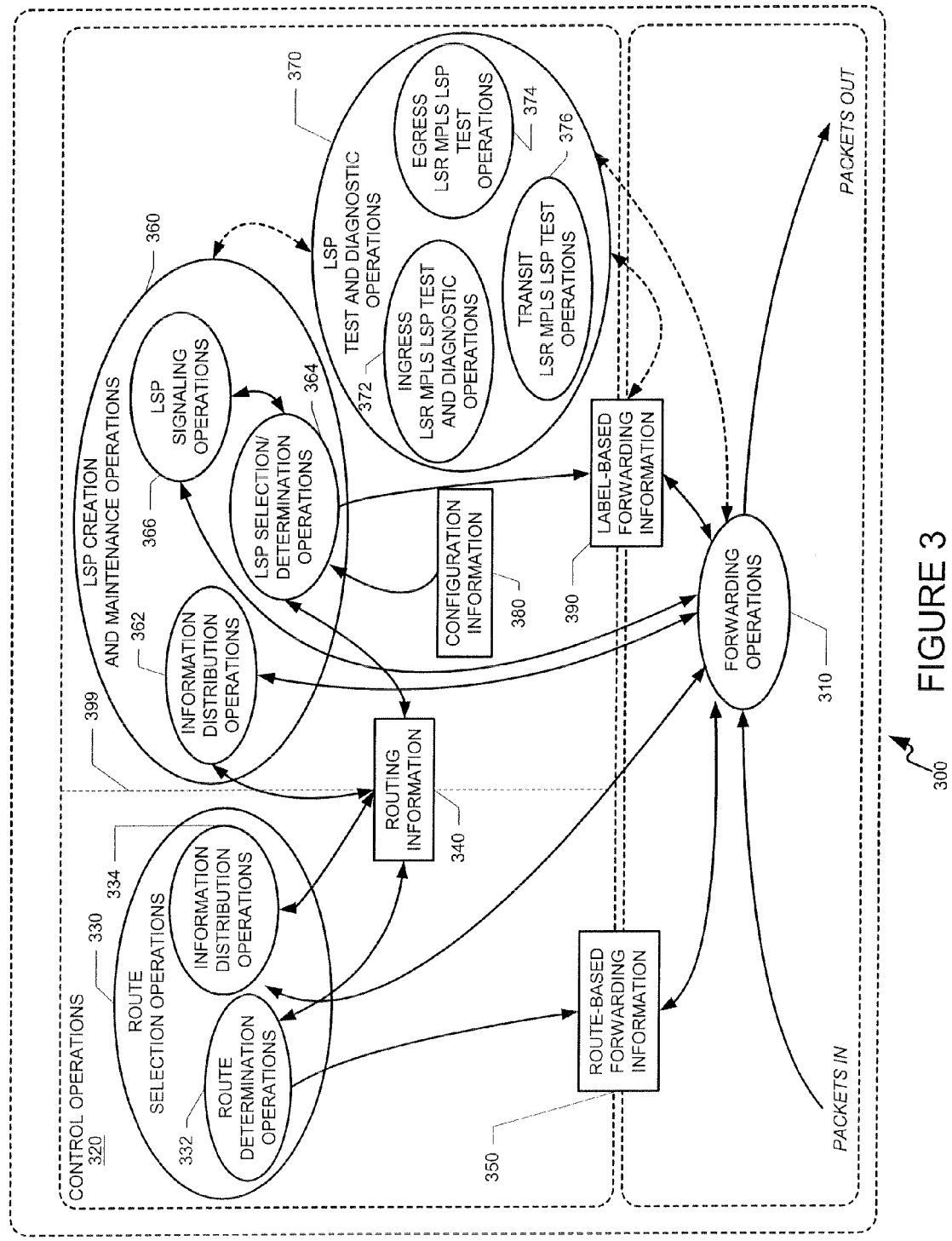
FIG. 3 is a bubble chart of a router which may operate in a manner consistent with principles of the present invention.

FIG. 3 is a bubble-chart of an exemplary router 300 with which principles of the invention may be used. Router 300 may include a packet forwarding operations 310 (part of a "data plane") and control (e.g., routing) operations 320 (part of a "control plane"). Packet forwarding operations 310 may forward received packets based on route-based forwarding information 350 or based on label-based forwarding information 390, such as LSP information.

Regarding control operations 320, the operations and information depicted to the right of dashed line 399 are related to creating and maintaining virtual links, such as LSPs, while the operations and information depicted to the left of dashed line 399 are related to creating routes. These operations and information needn't be performed and provided, respectively, on all routers of a network.

The route selection operations 330 include information distribution operations 334 and route determination operations 332. Information distribution operations 334 may be used to discover network topology information, store it as routing information 340, and distribute such information. Route determination operations 332 may use routing information 340 to generate route-based forwarding information 350.

The LSP creation and maintenance operations 360 (e.g., RSVP, LDP, BGP, etc.) may include an information distribution operations 362, LSP selection/determination operations 364, and LSP signaling operations 366. Information distribution operations 362 may be used to obtain information about the network, store such information as LSP information (not shown), and distribute such information. LSP determination/selection operations 364 may use routing information 340, the LSP information, configuration information 380, or some combination of these, to generate label-based forwarding information 390, such as LSPs. LSP signaling operations 366 may be used to accept and disseminate label-based forwarding information.

Consistent with principles of the invention, exemplary router 300 may also include (e.g., MPLS) LSP test and diagnostic operations 370. Test and diagnostic operations 370 may include ingress LSR (e.g., MPLS) LSP test and diagnostic operations 372, egress LSR (e.g., MPLS) LSP test operations 374, and/or transit LSR (e.g., MPLS) LSP test operations 376. Ingress LSR MPLS LSP test and diagnostic operations 372 may use label-based forwarding information 390 to test (e.g., suspect) LSPs, if router 300 is the ingress LSR of the (suspect) LSP to be tested. Egress LSR MPLS LSP test operations 374 may use label-based forwarding information 390 and may also use LSP signaling operations 366 or route-based forwarding information 350 to respond to requests (e.g., from an ingress LSR) in a reliable manner. Similarly, the transit LSR MPLS LSP test operations 376 may use label-based forwarding information 490 to forward requests, and may use LSP signaling operations 366 or route-based forwarding information 350 to respond to certain (e.g., fault isolation) requests from the ingress LSR, in a reliable manner. As will be appreciated by those skilled in the art, various nodes or LSRs do not need to support all of these LSP tests and diagnostic operations 370. Further interactions between these operations as they pertain to the invention are described below.

§4.2 High-Level Functions that May be Performed Consistent with Principles of the Invention The principles of the invention may be used to detect data plane failures in LSPs. To this end, the principles of the invention may (i) specify information carried in an LSP connectivity or fault isolation request and connectivity or fault isolation reply messages; and (ii) specify the transport of the connectivity or fault isolation reply back to the requesting node (e.g., the ingress LSR). The LSP connectivity or fault isolation request and reply messages provide information to check correct operation of the data plane, as well as a mechanism to verify the data plane against the control plane, and thereby localize faults. The transport of the connectivity or fault isolation reply back to the requesting node may use a reliable reply channel for more robust fault isolation.

Before performing the diagnostic operation, it should be determined if both ingress and egress LSRs support the diagnostic operation. Such a check is not mandatory, but would prevent false negatives.

In addition, to protect against Denial of Service (DoS) attacks, the request should be encapsulated in a protocol that offers flow control mechanisms. For example, a rate limiter could be applied to the well-know user datagram protocol (UDP) port. This limits the damage that may be caused if an LSR is flooded with packets carrying echo requests, which is typical in a DoS attack.

§4.3 Exemplary Operations

Basically, the principles of the invention may be used to ensure that packets belonging to a particular LSP actually end up on an egress LSR for that LSP. In FIG. 3, the ingress LSR MPLS LSP diagnostic operations 372 may be used to generate an MPLS test node request that carries information about the LSP being verified. Such a request could be generated by some node other than the ingress LSR of the LSP being tested. For example, an echo request could be used. This echo request is forwarded just like any other packet belonging to the FEC associated with the LSP. The request may specify a mode of the diagnosis—either end-to-end (dubbed a "ping" or connectivity mode), or to check each segment of the LSP (dubbed a "trace_route" or fault isolation mode).

In the ping (connectivity test) mode, the packet should reach an egress LSR of the LSP. Here, the egress LSR sends the relevant information to its control plane (to its egress LSR MPLS LSP diagnostic operations 374) which (i) determines whether or not it is indeed an egress for the LSP being tested, and (ii) returns a reply to the ingress LSR via a path or mechanism presumed to be reliable.

In trace_route (fault isolation test) mode, each transit LSR sends the relevant information to its control plane (to its transit LSR MPLS LSP diagnostic operations 376) which (i) determines whether or not it is indeed a transit LSR for the LSP being tested, and (ii) returns further information that helps check the control plane against the data plane (i.e., that forwarding matches what the protocols determined as the path).

One way these message modes can be used is to have ingress LSR MPLS LSP diagnostic operations 372 periodically test connectivity. If the connectivity test fails, ingress LSR MPLS LSP diagnostic operations 372 can then initiate a fault isolation test. Although ingress LSR MPLS LSP diagnostic operations 372 can also periodically run fault isolation tests to verify that forwarding matches the downstream router information returned earlier over the control plane, this places a greater burden on transit LSRs and should therefore be used judiciously.

Having introduced the ingress, egress, and transit LSR MPLS LSP diagnostic operations, exemplary methods, data structures and apparatus that may be used to perform these operations in a manner consistent with principles of the present invention are now described in §4.4 below.

§4.4 Methods, Data Structures, and Apparatus

Exemplary apparatus, data structures and methods for performing the functions summarized in §4.2 and introduced in §4.3, are described in this section. More specifically, exemplary apparatus are described in §4.4.1, exemplary data structures are described in §4.4.2, and exemplary methods are described in §4.4.3 below.

§4.4.1 Exemplary Apparatus

Figure 4:
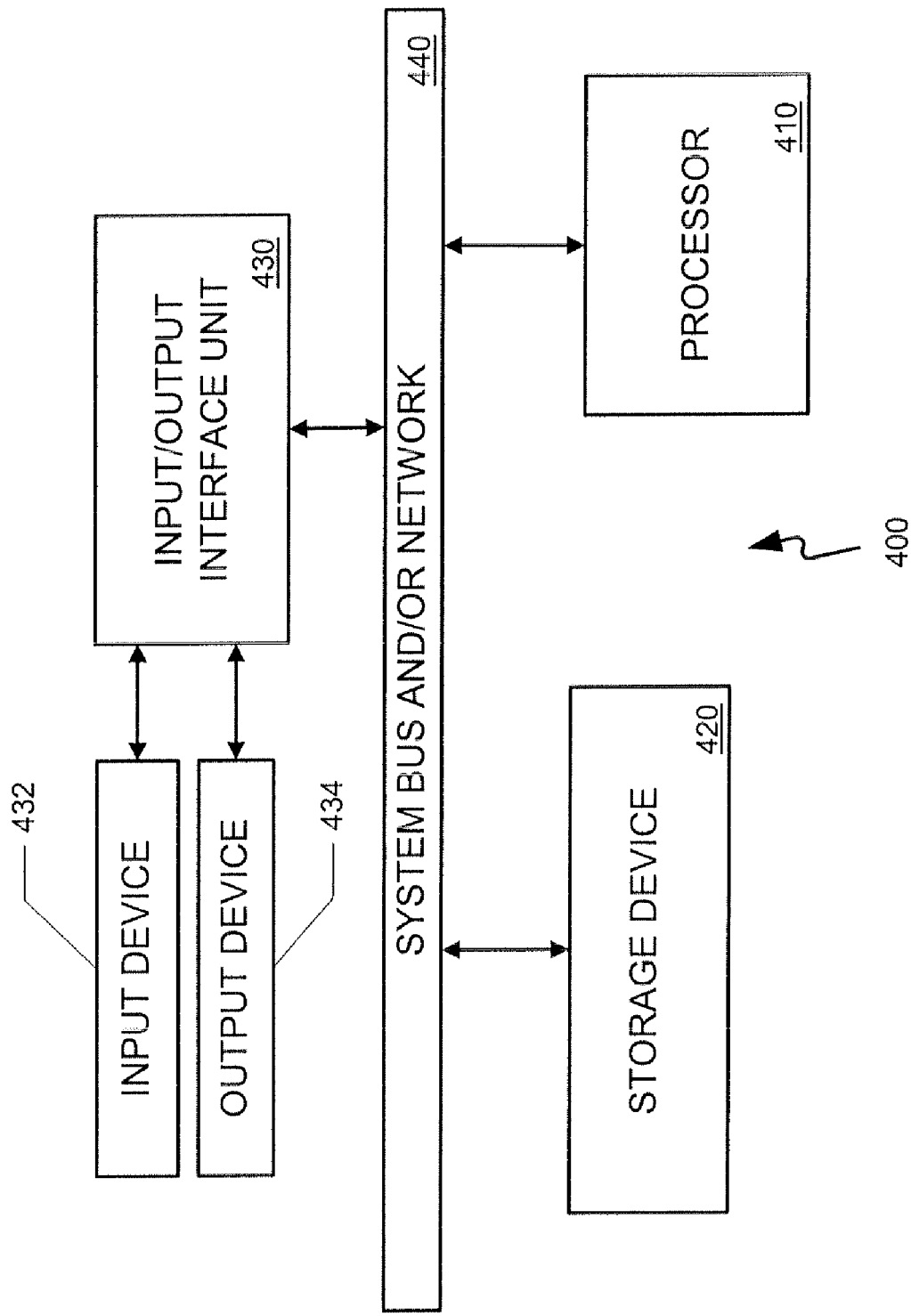
FIG. 4 is a block diagram of an apparatus that may be used to perform operations consistent with principles of the present invention.

FIG. 4 is high-level block diagram of a machine 400 that may perform one or more of the operations discussed above. Machine 400 includes a processor 410, an input/output interface unit 430, a storage device 420, and a system bus 440 for facilitating the communication of information among the coupled elements. An input device 432 and an output device 434 may be coupled with the input/output interface 430. Operations of the invention may be effected by the processor 410 executing instructions. The instructions may be stored in the storage device 420, received via the input/output interface 430, or both. The instructions may be functionally grouped into processing modules. Although not shown, more than one of some or all of these components may be provided.

Machine 400 may be a router, such as an LSR. In an exemplary LSR, processor 410 may include a microprocessor, a network processor, (e.g., custom) integrated circuits, or some combination of these and other elements. In the exemplary LSR, storage device 420 may include ROM, RAM, SDRAM, SRAM, SSRAM, DRAM, flash drive, hard disk drive, flash cards or some combination of these. At least some of these storage devices 420 may include program instructions defining an operating system, a protocol module (e.g., a daemon), and other modules. In one embodiment, methods consistent with the principles of the invention may be performed by a microprocessor executing stored program instructions (e.g., defining a part of the protocol module or daemon). At least a portion of the instructions may be stored temporarily or permanently on storage device 420, received from an external source via an input interface unit 430, or both. Finally, in the exemplary LSR, input/output interface unit 430, input device 432 and output device 434 may include interfaces to terminate communications links.

Operations consistent with the principles of the present invention may be performed on apparatus other than routers. Such other apparatus may employ similar or different hardware and software.

§4.4.2 Exemplary Data Structures

Figure 5:
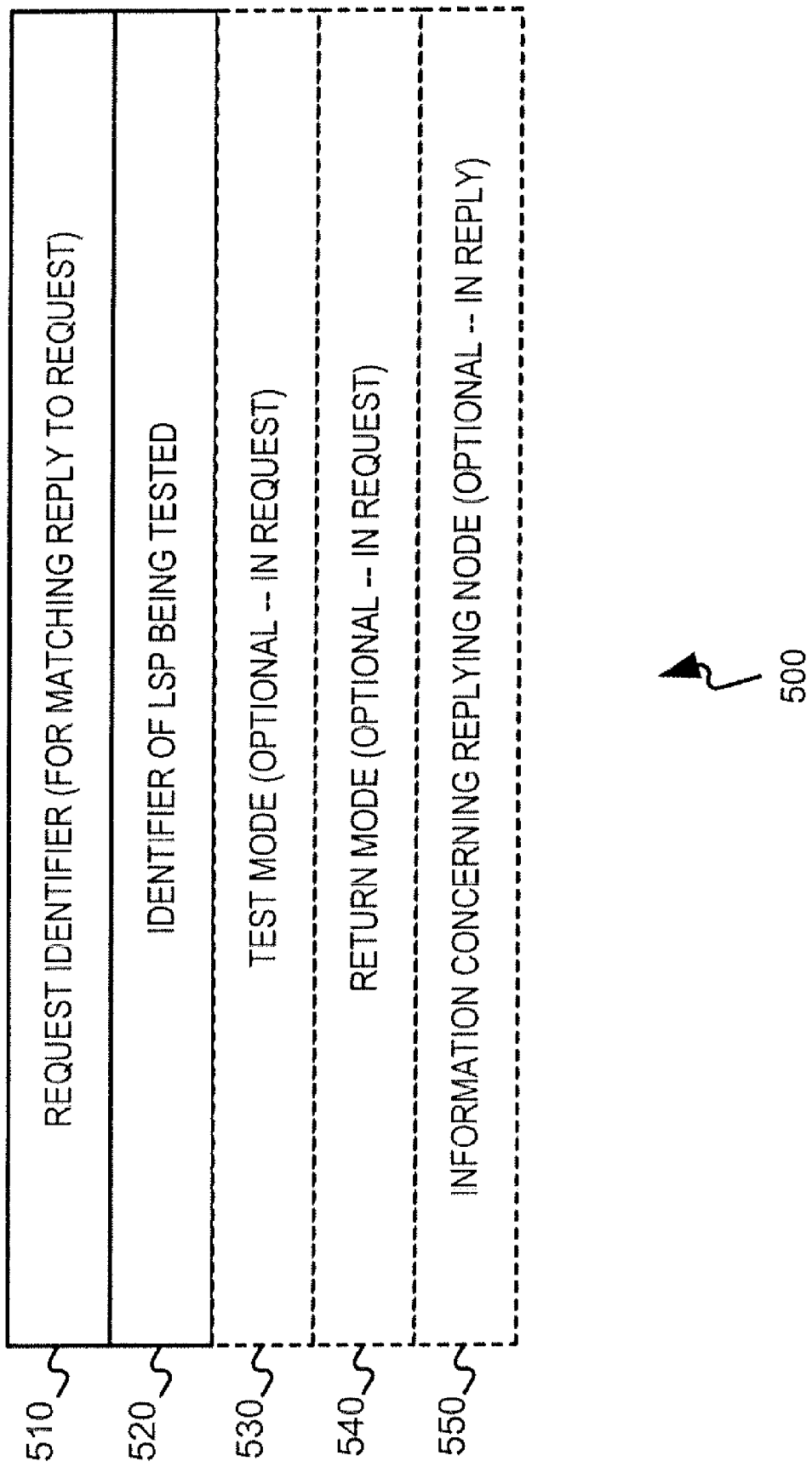
FIG. 5 is a diagram of exemplary information that should be provided in a request or reply related to testing an LSP in a manner consistent with principles of the present invention.

FIG. 5 illustrates a data structure of an object 500 that may be included in a request or a reply. Object 500 may include a request identifier 510 and an identifier 520 of the LSP (or FEC) being tested. Request identifier 510 may be used to match a received reply to a previously sent request, and should therefore be able to identify uniquely, at least locally at a given ingress LSR or some other node that initiated the test, a request. Accordingly, request identifier 510 may include one or more of: (i) an identifier of a process used to generate the request (and a sequence number or time stamp if a given process generates multiple requests); (ii) a time stamp; and (iii) an ingress LSR global identifier (e.g., a layer 3 (e.g., IP) address). Identifier 520 of the LSP (or FEC) being tested may be a FEC stack. The FEC stack may include, for example, an IP (e.g., version 4 or 6) prefix, an RSVP IP (e.g., version 4 or 6) session, a CR-LDP LSP identifier, a VPN IP (e.g., version 4 or 6) prefix, some layer 2 VPN prefix, etc.

As shown, object 500 may include additional information, such as a test mode 530, a return mode 540, and information 550 concerning a replying node. Test mode 530 may be carried in the object of the request and may specify one of a number of tests (e.g., connectivity or fault isolation) to be performed. Return mode 540 may be carried in the object of the request and may specify how the reply is to be returned to the ingress LSR or some other node that initiated the test. That is, return mode 540 may be used to specify a return channel such as routed path, routed path with router alert, control plane, etc., presumed to be reliable. Finally, information 550 concerning the replying node may be carried in an object of the reply and may be used to relay information about the node that generated the reply in response to the request.

Figure 6:
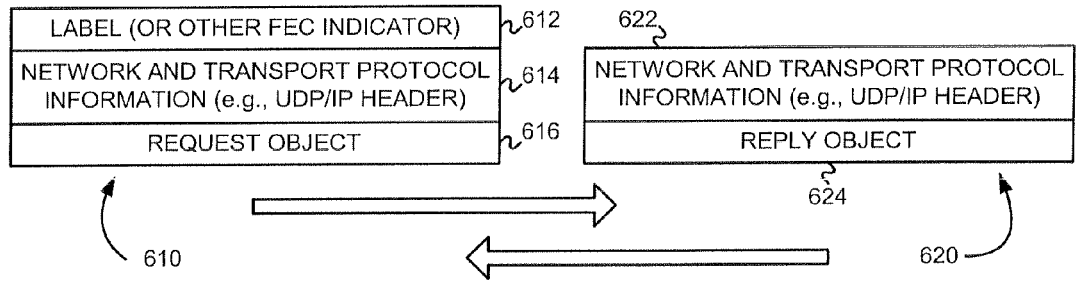
FIG. 6 illustrates a request object provided with header information and a label, and a reply object provided with header information in a manner consistent with principles of the present invention.

FIG. 6 illustrates exemplary request and reply messages. A request message 610 may include a request object 616 (such as 500, described above), network and transport layer protocol information (such as a UDP header and an IP header) 614, and a label or other information for identifying a FEC 612 for forwarding information 614/616 over an LSP being tested. A reply message 620 may include a reply object 624 (such as 500, described above), and network and transport layer protocol information 622, such as a UDP header and an IP header.

§4.4.2.1 Detailed Data Structures

Figure 7:
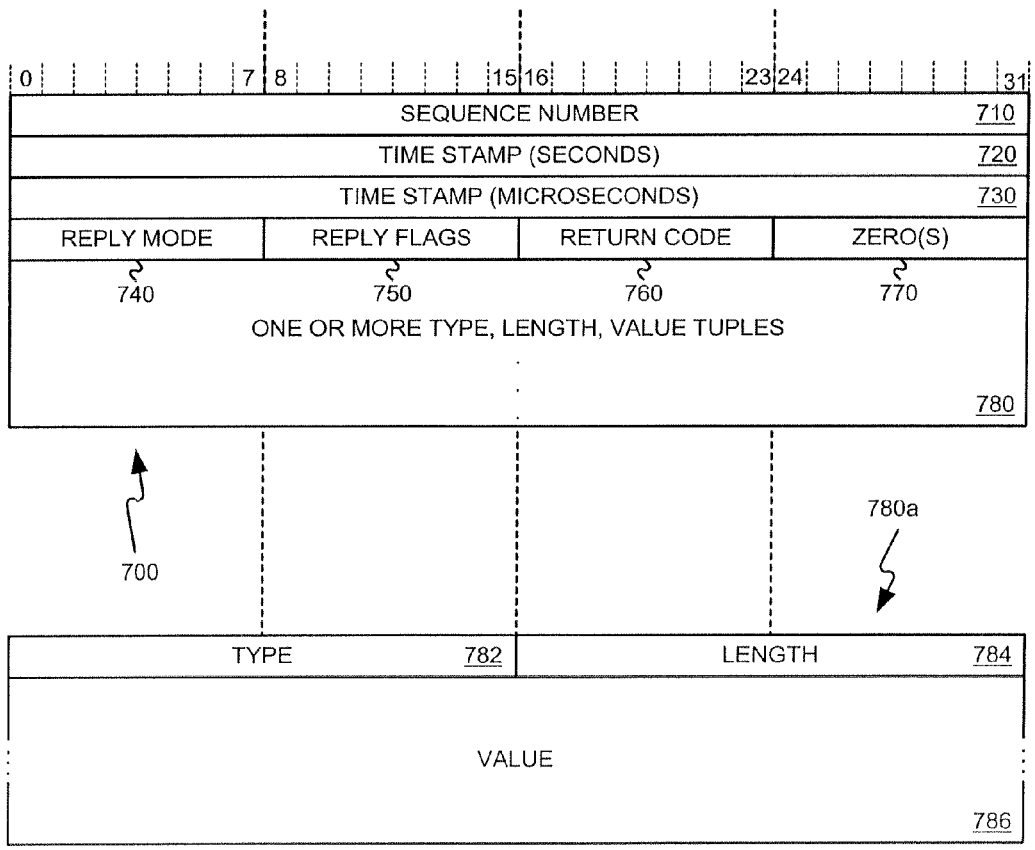
FIG. 7 illustrates an exemplary data structure that may be used as a request and/or reply object in a manner consistent with principles of the present invention.

FIG. 7 illustrates a data structure of an exemplary object 700 that may be used as a request or reply object 616/624 in a manner consistent with principles of the invention. Object 700 may include a field 710 for carrying a sequence number, fields 720 and 730 for carrying a time stamp in seconds, and microseconds, a field 740 for carrying a reply mode, a field 750 for carrying reply flags, a field 760 for carrying a return code, a field 770 for carrying one or more zeros, and one or more TLV tuples 780.

The sequence number carried in field 710 may be 32 bits and may be assigned by the originator of the request. The sequence number serves to help match a reply to a request and can therefore be used, for example, to detect missed replies.

The time stamp carried in fields 720 and 730 may be set to the time of day (in seconds (32 bits) and microseconds (32 bits)) when the request or reply is sent. The time stamp may be used, for example, to compute delay or round trip time, to help match a reply to a request, or both.

The reply mode carried in field 740 may be used to specify a type of a presumed reliable return path. The reply mode may be eight bits and, in one exemplary embodiment, may take one of the following values:

| Value | Meaning |
| --- | --- |
| 1 | Reply via an IPv4 UDP packet; |
| 2 | Reply via an IPv4 UDP packet with Router Alert; and |
| 3 | Reply via the control plane. |

The reply flags carried in field 750 may be eight bits and, in one exemplary embodiment, are a bit vector with bit 0x1 being the Least Significant Bit and bit 0x80 being the Most Significant Bit, with some bits being defined as follows:

| Bit | Meaning when set |
|---|---|
| 0x1 | Downstream Mappings desired; and |
| 0x2 | Upstream direction pinged. |

Downstream mappings are described later. In the exemplary embodiment, bit 0x2 is set when the reverse (upstream) direction of a bi-direction LSP is being tested, and the rest of the bits are reserved and set to zero.

The return code carried in field 760 may be eight bits and, in one embodiment, may take one of the following values:

| Value | Meaning |
|---|---|
| 1 | Replying router is an egress for the FEC; |
| 2 | Replying router has no mapping for the FEC; |
| 3 | Replying router is not one of the "Downstream Routers"; |
| 4 | Replying router is one of the "Downstream Routers", and its mapping for this FEC on the received interface is the given label; and |
| 5 | Replying router is one of the "Downstream Routers", but its mapping for this FEC is not the given label. |

A reply to a connectivity request with a return code value=1 indicates that the LSP is fine. A reply to a connectivity or fault isolation request with a return code value=2 indicates that the packet "strayed" from the LSP. A reply to a fault isolation request with a return code value=3 indicates the replying router is not one of the routers that the immediate upstream router earlier indicated as being a downstream router. A reply to a fault isolation request with a return code value=4 indicates that the LSP is fine at least up to the point of the replying router. Finally, a reply to a fault isolation request with a return code value=5 indicates that the immediate upstream router is sending the packet to a correct LSR, but using the wrong label.

The TLV tuples 780 may have a 16-bit type field 782, a 16-bit length field 784, and a value 786. Exemplary types are defined below:

| Type # | Value Field |
|---|---|
| 1 | Target FEC Stack; and |
| 2 | Downstream Mapping. |

Length field 784 may be the length of value field 786 in octets. Value field 786 depends on the type and is preferably zero padded to align to a four-octet boundary. Exemplary target FEC stack TLVs and downstream mapping TLVs are described below in §§4.4.2.1.1 and 4.4.2.1.2, respectively.

§4.4.2.1.1 Exemplary FEC Stack TLVs

In one exemplary embodiment, a target FEC stack is a list of sub-TLVs. The number of elements is determined by looking at the sub-TLV length fields. Target FEC stack sub-TLVs may include the following:

| Type # | Length | Value Field |
|---|---|---|
| 1 | 5 | IPv4 prefix |
| 2 | 17 | IPv6 prefix |
| 3 | 16 | RSVP IPv4 Session |
| 4 | 52 | RSVP IPv6 Session |
| 5 | 6 | CR-LDP LSP ID |
| 6 | 13 | VPN IPv4 prefix |
| 7 | 25 | VPN IPv4 prefix |
| 8 | case dependent | L2 VPN "prefix" |

Other FEC stack types may be defined as needed. Note that this TLV defines a stack of FECs in which the first FEC element corresponds to the top of the label stack, etc. It may be assumed that the stack consists of just one element. Some of the exemplary FEC stack types are now described.

Figure 8:
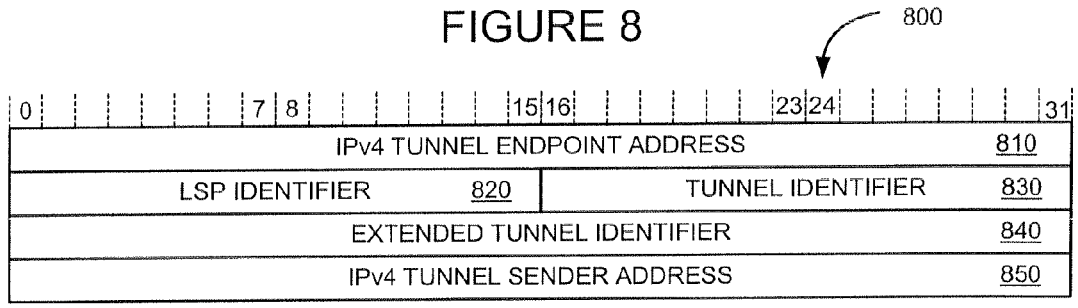
FIG. 8 illustrates an exemplary data structure that may be used as a resource reservation protocol (RSVP) IPv4 Session FEC stack type.

In the exemplary IPv4 Prefix FEC stack type, the value consists of four octets of an IPv4 prefix followed by one octet of prefix length in bits. The IPv4 prefix is in network byte order. In the exemplary IPv6 Prefix FEC stack type, the value consists of sixteen octets of an IPv6 prefix followed by one octet of prefix length in bits. The IPv6 prefix is in network byte order. FIG. 8 illustrates an exemplary value 800 showing an RSVP IPv4 Session FEC stack type. As shown, value 800 may include a 32-bit IPv4, tunnel endpoint address field 810, a 16-bit LSP identifier field 820, a 16-bit LSP identifier field 830, a 32-bit extended tunnel identifier field 840 and a 32-bit IPv4, tunnel sender address 850. The value fields are taken from the publication D. Awduche, et. al., "RSVP-TE: Extensions to RSVP for LSP Tunnels," Request for Comments: 3209, sections 4.6.1.1 and 4.6.2.1, (Internet Engineering Task Force, December 2001) (Hereafter referred to as "RFC 3209" and incorporated herein by reference.)

Figure 9:
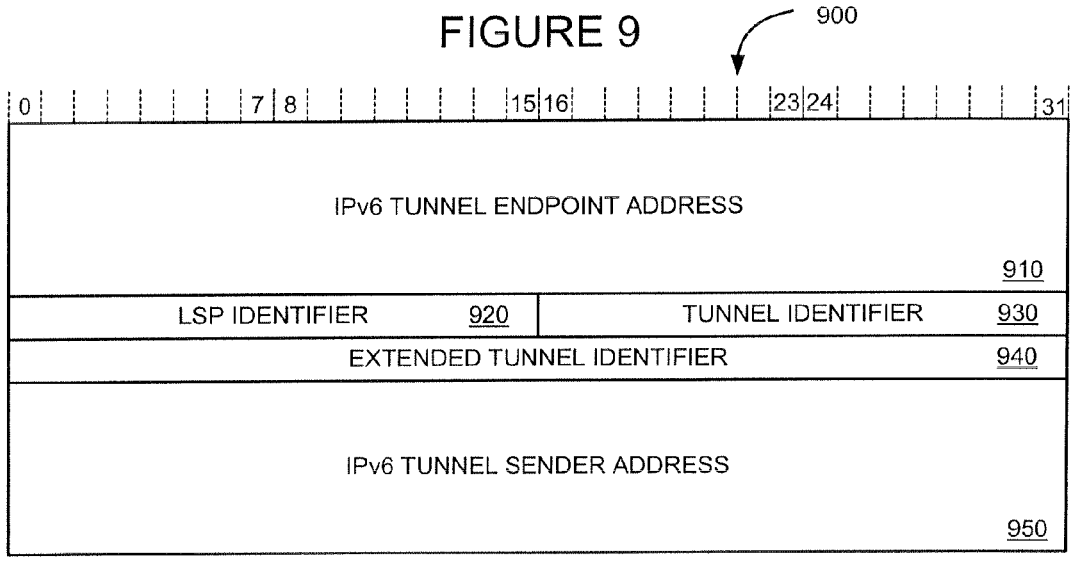
FIG. 9 illustrates an exemplary data structure that may be used as an RSVP IPv6 Session FEC stack type.

FIG. 9 illustrates an exemplary value 900 showing an RSVP IPv6 Session FEC stack type. As shown, value 900 may include a 128-bit IPv6, tunnel endpoint address field 910, a 16-bit LSP identifier field 920, a 16-bit LSP tunnel identifier field 930, a 32-bit extended tunnel identifier field 940 and a 128-bit IPv6, tunnel sender address 950. The value fields are taken from sections 4.6.1.2 and 4.6.2.2 of RFC 3209. An exemplary value of a CR-LDP LSP ID FEC stack type (not shown) could consist of the LSP ID of the LSP being pinged. An LSP ID is a four octet IPv4 address (a local address on the head end LSR) plus a two octet identifier that is unique for each LSP that starts on an LSR.

§4.4.2.1.2 Exemplary Downstream Mapping TLVs

Figure 10:
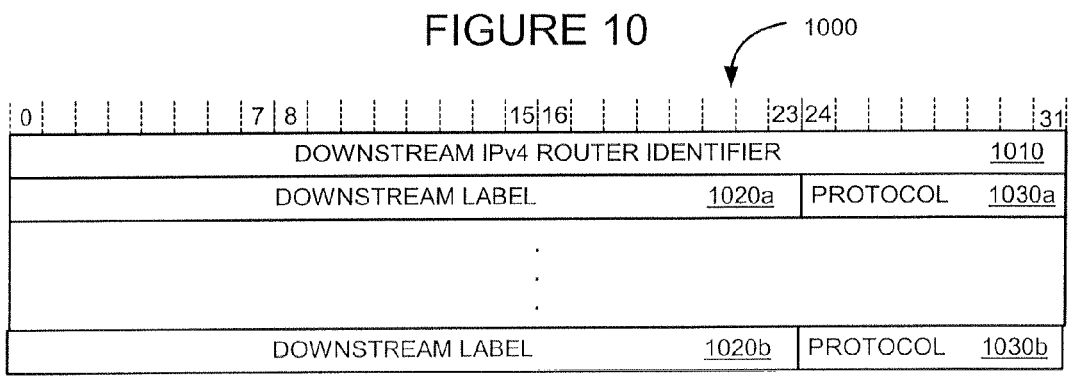
FIG. 10 illustrates an exemplary data structure that may be used as a downstream mapping type-length-value (TLV).

The downstream mapping TLV is an optional TLV that may be carried in an echo request. The length of an exemplary downstream mapping TLV may be 4+4*N bytes, where N is the number of downstream labels. In the exemplary downstream mapping TLV illustrated in FIG. 10, the value 1000 may include a 32 bit downstream IPv4, router identifier field 1010, and one or more 24 bit downstream label field 1020, 8 bit protocol field 1030 pairs. Exemplary values for protocol field 1030 are as follows:

| Protocol # | Signaling Protocol |
|---|---|
| 0 | Unknown |
| 1 | Static |
| 2 | BGP |

-continued

| Protocol # | Signaling Protocol |
| --- | --- |
| 3 | LDP |
| 4 | RSVP-TE |
| 5 | CR-LDP |

Figure 11:
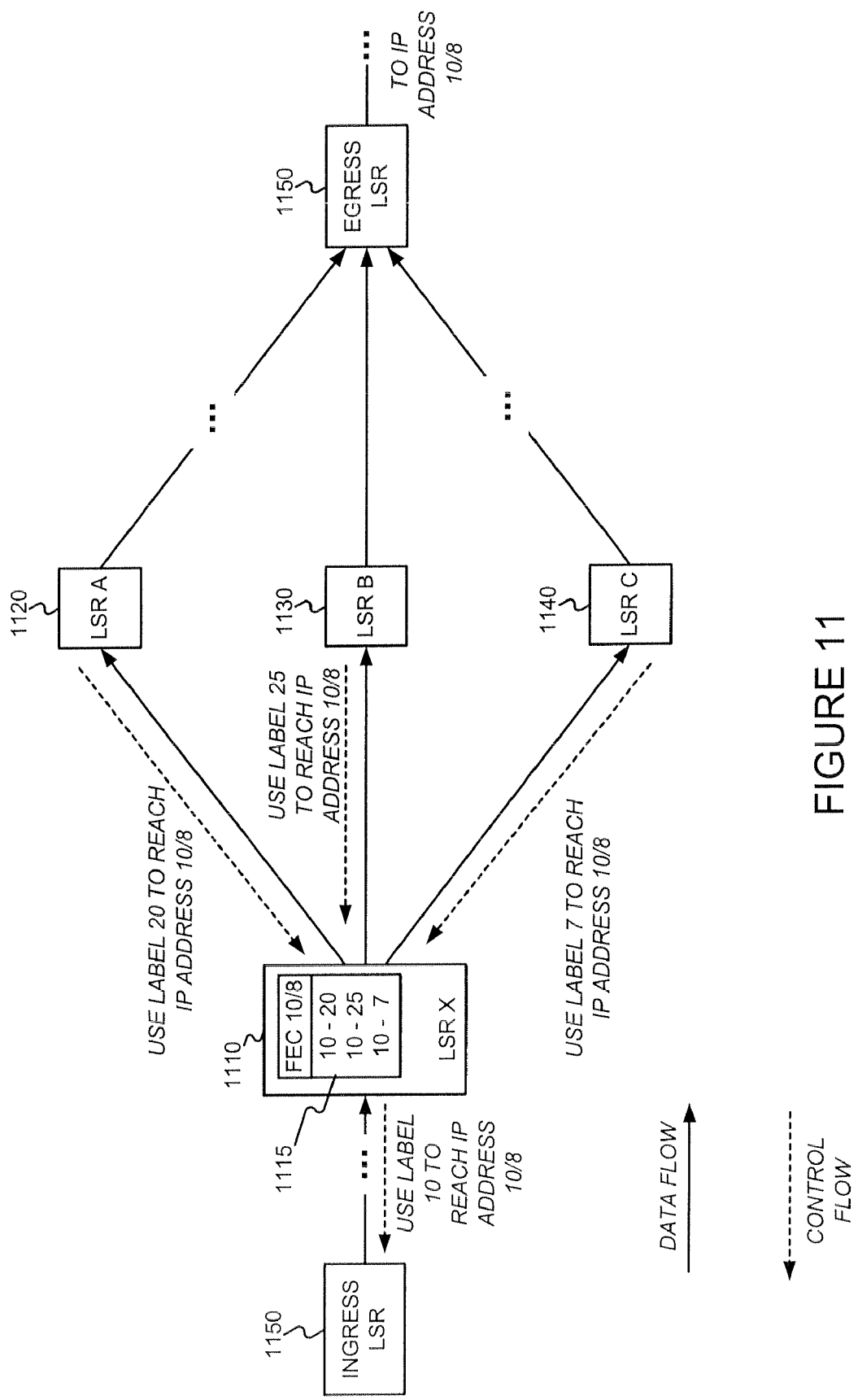
FIG. 11 illustrates the concept of downstream mapping.

FIG. 11 illustrates how a downstream router is defined. Consider an LSR X 1110 and a FEC for all packets with an IP address prefix 10/8. Assume that an LSR A 1120, an LSR B 1130 and an LSR C 1140 have advertised their labels bound to a FEC corresponding to IP address prefix 10/8 to upstream LSR X 1110, and that LSR X 1110 advertises its label bound to the FEC corresponding to IP address prefix 10/8 to its upstream LSR or LSRs. As shown by table 1115, the FEC can be used to bind the label used by LSR X 1110 (namely 10) with those of downstream LSRs 1120, 1130, 1140 (namely, 20, 25 and 7). However, LSR X 1110 may, subject to some policy constraint for example, decide that it only wants to use LSR A 1120 and LSR B 1130 as downstream routers for this FEC. Consistent with principles of the invention, LSR X would consider LSR A 1120 and LSR B 1130 to constitute its set of downstream routers.

Downstream routers may be defined when sending and receiving fault isolation messages. Unlike requests that test end-to-end connectivity, fault isolation requests test each segment along the LSP, verifying that the LSP is set up correctly, checking the data plane against the control plane and isolating faults. To do this, a fault isolation request is sent to the first router or routers along the LSP, and is subsequently sent to the next set of routers along the LSP. Typically, this is accomplished using the time-to-live (TTL) field in the label: if the TTL is set to N, one router among the Nth set of routers will receive the packet; having received a reply from that router, the ingress LSR then sets the TTL to N+1, and so on until the egress is reached. In this example, TTL corresponds to hop count, which is the way TTL has been used customarily. Alternative ways of reaching each router along the LSP path in order may also be used.

If a fault isolation request packet with outermost label 10 arrives at LSR X 1110, LSR X 1110 determines which LSRs could be the next recipients of the packet, and what label they would see. Here, the downstream routers and their corresponding labels for X with respect to label 10 are {LSR A,20} and {LSR B,25}.

Although not the case in the example illustrated in FIG. 11, LSR X 1110 could be the ingress LSR of the LSP, and/or LSR A 1120, LSR B 1130 and LSR C 1140 could be egress LSRs of the LSP. If LSR X 1110 is the LSR originating the fault isolation echo request, then LSR X 1110 determines which LSRs would be the first recipients of a fault isolation message to the FEC stack that is being tested.

§4.4.3 Exemplary Methods

Figure 12:
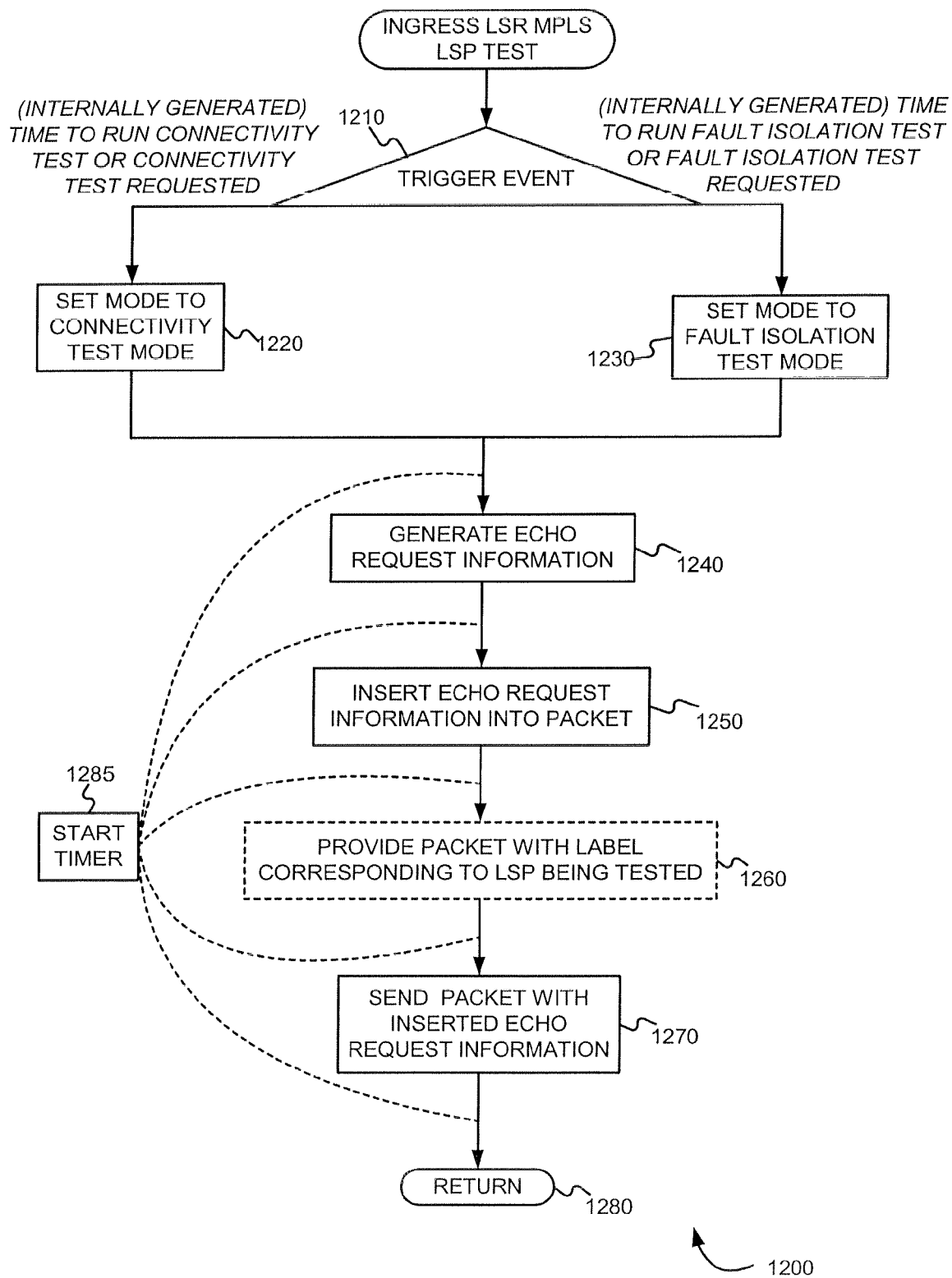
FIG. 12 is a flow diagram of an exemplary method, which may be performed by an ingress LSR of an LSP, for testing a suspect LSP in a manner consistent with principles of present invention.
Figure 14:
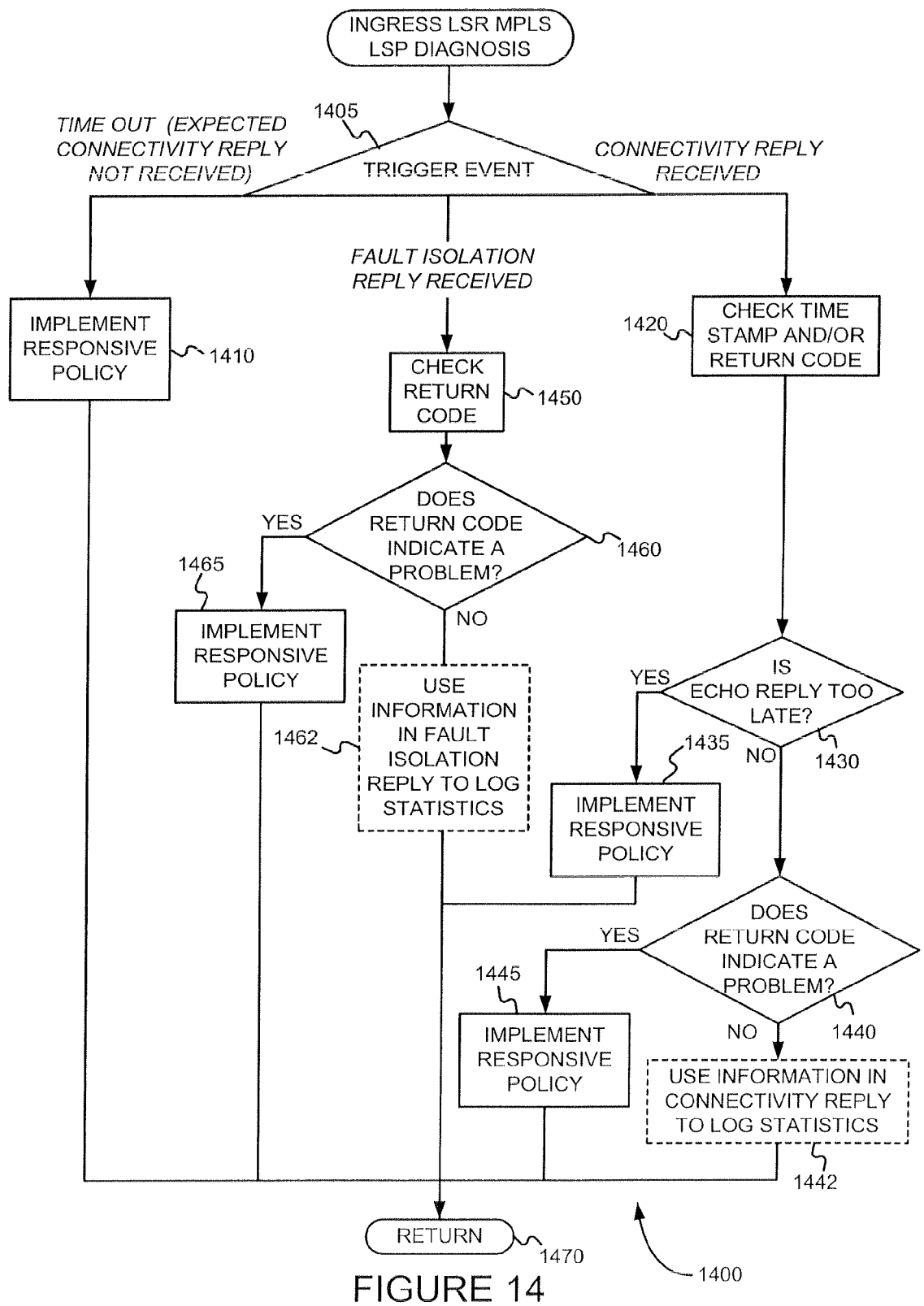
FIG. 14 is a flow diagram of an exemplary method, which may be performed by an ingress LSR of an LSP, for diagnosing a tested LSP in a manner consistent with principles of present invention.

FIG. 12 is a flow diagram of an exemplary method 1200 that may be used to perform a test portion of the ingress LSR MPLS LSP test and diagnosis operations 372 in a manner consistent with principles of the present invention. Exemplary method 1200 does not show actions made in response to a reply being received by the ingress LSR. FIG. 14 shows an exemplary method for making such determinations. If it is time to run a connectivity test (for example, internally generated) or if a connectivity test is requested (event block 1210), a mode parameter is set to a connectivity test (ping) mode (act 1220), before the method 1200 proceeds to act 1240. Referring back to trigger block 1210, if it is time to run a fault isolation test (for example, internally generated) or if a fault isolation test is requested, a mode parameter is set to a fault isolation test (trace_route) mode (act 1230), before method 1200 proceeds to act 1240. As will be described with reference to FIG. 14, if an expected connectivity test reply is not received, the fault isolation test mode may be requested. At this point, the desired mode will have been determined.

Further, echo request information (e.g., a request object) is generated (act 1240). Referring back to FIG. 5, this request information may include a request identifier (for matching a reply to the request) 510, and an identifier 520 of the LSP (or FEC) being tested. This information may also include a test mode identifier (connectivity or fault isolation) 530, as well as a return mode 540. The request information may also include further information, such as that described above with reference to FIG. 7.

Next, the echo request information (e.g., a request object) is inserted into a packet (e.g., with network and transport protocol information, such as UDP/IP) (act 1250). (Recall, for example, network and transport protocol headers 614 of FIG. 6.) If an LSP is being tested, the packet with the request information may be provided with a label corresponding to the LSP being tested (act 1260). (Recall, for example, label 612 of FIG. 6.) Finally, the labeled packet with the inserted request information is forwarded (act 1270), before method 1200 is left (node 1280). A timer may be started (act 1285) at any one of a number of places in method 1200, but is preferably started just before the packet is sent. The ingress LSR can use this timer to determine whether an expected reply should have arrived.

Regarding acts 1240 and 1250, the following illustrates an example of generating an echo request object and inserting it into a UDP packet. An exemplary MPLS echo request is a labeled UDP packet sent to a predetermined port for an MPLS ping (e.g., as defined by the Internet Assigned Numbers Authority (IANA)), with the destination IP address set to the ALL-ROUTERS multicast address (224.0.0.2). All router multicasting avoids the need to identify the IP address of the egress LSR of the LSP being tested. The source IP address is set to a routable address of the sender (e.g., the ingress LSR). The source port may be used to identify the sending process. In this example, the MPLS echo request object includes a FEC Stack TLV 780a. Further, the reply mode 740 is set to a desired, presumably reliable, return path type. The return code 760 is set to zero and ignored on receipt.

In one embodiment of the end-to-end connectivity test (ping) mode, the value of the TTL field in the outermost label is set to 255. In one embodiment of the fault isolation test (trace_route) mode, the value of the TTL field is set successively to 1, 2, . . . , etc., so that successive fault isolation echo requests are forwarded, progressively further, down the LSP.

In the fault isolation test, the echo request should contain one or more downstream mapping TLVs 780a. For TTL=1, all the downstream routers (and corresponding labels) for the sender with respect to the FEC Stack being tested should be sent in the echo request. For TTL=n, where n>1, the downstream mapping TLVs from the echo reply for TTL=(n−1) are copied to the echo request with TTL=n.

Figure 13:
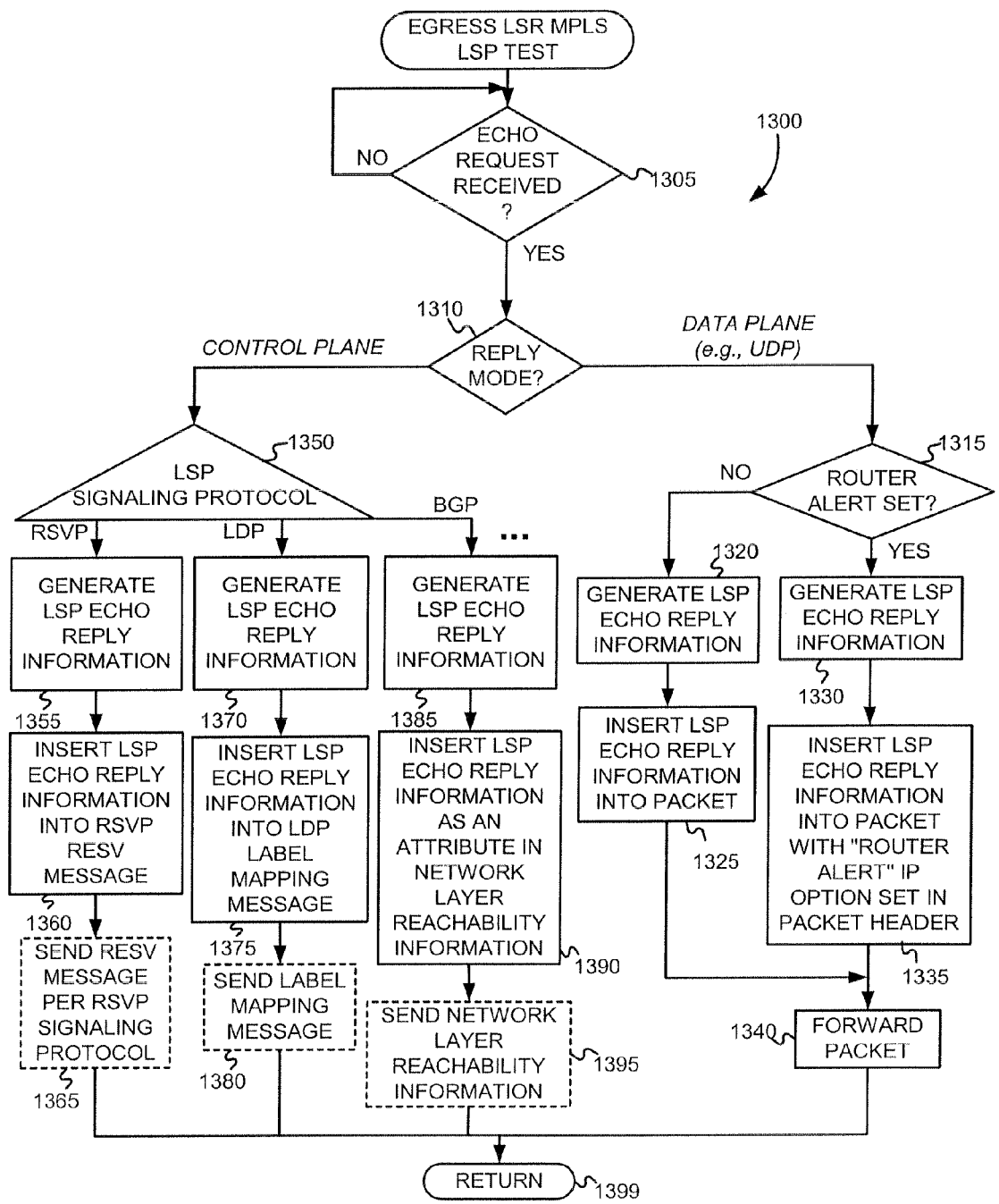
FIG. 13 is a flow diagram of an exemplary method, which may be performed by an egress LSR of an LSP, for testing a suspect LSP in a manner consistent with principles of present invention.

FIG. 13 is a flow diagram of an exemplary method 1300 that may be used to perform the egress LSR MPLS LSP test operations 374 in a manner consistent with principles of the present invention. As shown, the main portion of method 1300 is performed when an echo request is received (decision block 1305). More specifically, the reply mode is determined (decision block 1310). If the reply mode (in the received echo request) is set such that the reply is to reach the requesting ingress LSR using a (non-LSP) data plane, such as UDP for example, it is determined whether a router alert was set in the reply mode (decision block 1315). If not, LSP echo reply information, such as an object, is generated, the generated information is inserted into a packet, such as a UDP packet, and the packet is forwarded (acts 1320, 1325 and 1340, respectively) before method 1300 is left (node 1399). Referring back to decision 1315, if a router alert was set in the reply mode, LSP echo reply information is generated, the generated information is inserted into a packet with the router alert IP option set in the packet header, and the packet is forwarded (acts 1330, 1335 and 1340, respectively) before method 1300 is left (node 1399). In either case, the packet is addressed to the node (typically the ingress LSR of the LSP being tested) that sourced the request.

Referring back to decision 1310, if the reply mode (in the received echo request) is set such that the reply is to reach the requesting ingress LSR using control plane signaling, such as RSVP, LDP, CR-LDP, or BGP for example, it is determined what protocol was used to establish and/or maintain the LSP (decision 1350). Method 1300 shows examples in which the RSVP, LDP or BGP protocol was used. However, those skilled in the art could apply these principles to provide similar schemes for other protocols. More specifically, if RSVP was used to signal the LSP being tested, then the LSP echo reply information is generated (act 1355), inserted into a RSVP RESV message (act 1360), which is then sent per the RSVP signaling protocol (act 1365), before method 1300 is left (node 1399). Referring back to act 1350, if LDP was used to signal the LSP being tested, then the LSP echo reply information is generated (act 1370), inserted into an LDP label mapping message (act 1375), which is then sent per the LDP signaling protocol (act 1380), before the method 1300 is left (node 1399). Note that unlike RSVP, which is point-to-point, LDP is multipoint-to-point because the egress LSR can be associated with multiple ingress LSRs. Thus, method 1300 is less efficient when a reply is sent via an LDP control plane and it may be desirable for the ingress LSR to specify a "data plane" reply mode when LDP is used. Referring back to act 1350, if BGP was used to signal the LSP being tested, then the LSP echo reply information is generated (act 1385), inserted, as an attribute, into a BGP network layer reachability information (NLRI) message (act 1390), which is then sent per the BGP signaling protocol (act 1395), before method 1300 is left (node 1399).

Regarding acts 1320/1330 and 1325/1325, the following illustrates an example of generating an echo reply object and inserting it into a UDP packet. In this example, the MPLS echo reply is a UDP packet and is only to be sent in response to an MPLS echo request. The source IP address is the router ID of the replier (e.g., egress or intermediate LSR). The source port is a predetermined UDP port for MPLS ping. The destination IP address and UDP port are copied from the source IP address and UDP port, respectively, of the echo request to which the MPLS echo reply is responding. The IP TTL is set to 255. If the reply mode in the echo request is "Reply via an IPv4 UDP packet with Router Alert", then the IP header is provided with the Router Alert IP option.

In this example, the format of the echo reply is the same as the echo request. Referring to FIG. 7, the sequence number 710 is copied from the echo request. The timestamp 720/730 is set to the current time-of-day. This information is most useful if the time-of-day clocks on the requestor and the replier are synchronized. The FEC Stack TLV 780*a* from the echo request is copied to the reply.

In this example, the replier fills in the return code 760. The return code 760 is determined based on whether the replier has a mapping for the FEC, and whether it is an egress for that FEC. Note that "having a mapping" for an RSVP FEC indicates that the replier is a transit LSR for the RSVP LSP defined by the FEC.

Recall that the echo request may contain a downstream mapping TLV 780*a*. If it does, the replier further checks whether its Router ID matches one of the Downstream IPv4 Router IDs. If so, the replier further checks whether the given downstream label is in fact the label that the replier sent as its mapping for the FEC. For an RSVP FEC, the downstream label is the label that the replier sent in its RESV message. The result of these checks are captured in the return code 760. If the flag requesting downstream mapping TLVs is set in the reply flags 750, the replier should compute its downstream routers and corresponding labels for the incoming label, and add downstream mapping TLVs 780 for each one to the echo reply it sends back.

FIG. 14 is a flow diagram of an exemplary method 1400 that may be used to perform the MPLS LSP diagnostic operations 372 in a manner consistent with principles of the present invention. Various branches of method 1400 may be performed in response to various events (trigger block 1405). More specifically, if a time out occurred, where an expected echo reply was not received (Recall, for example, starting timer 1285 in FIG. 12.), a responsive policy is implemented (act 1410). Such a responsive policy may be to request a fault isolation test to attempt to isolate the problem of the MPLS LSP, activate a backup route or path, compute a new path, etc. Method 1400 may then be left (node 1470).

Referring back to trigger event block 1405, if a connectivity echo reply is received, the time stamp, the return code, or both of the LSP echo reply information may be checked (act 1420). If the connectivity echo reply is received too late, a responsive policy may be implemented (acts 1430 and 1435). Note that this check may not be necessary if it is redundant to act 1410. If the return code indicates a problem, a responsive policy may be implemented (acts 1440 and 1445). The responsive policy may depend upon the type and severity of the problem indicated by the return code received. Method 1400 is then left (node 1470). Referring back to decision 1440, if the return code does not indicate a problem, then information in the connectivity reply may be used to log statistics about the LSP test (optional act 1442), before method 1400 is left (node 1470).

Referring back to trigger event block 1405, if a fault isolation reply is received, the return code in the fault isolation echo reply information (object) may be checked (act 1450). If the return code indicates a problem, a responsive policy may be implemented (acts 1460 and 1465). The responsive policy may depend upon the type and severity of the problem indicated by the return code received, as well as the location in the MPLS LSP were the error occurred. Method 1400 is then left (node 1470). Referring back to decision 1460, if the return code does not indicate a problem, then information in the fault isolation reply may be used to log statistics about the LSP test (optional act 1462), before method 1400 is left (node 1470).

Figure 15:
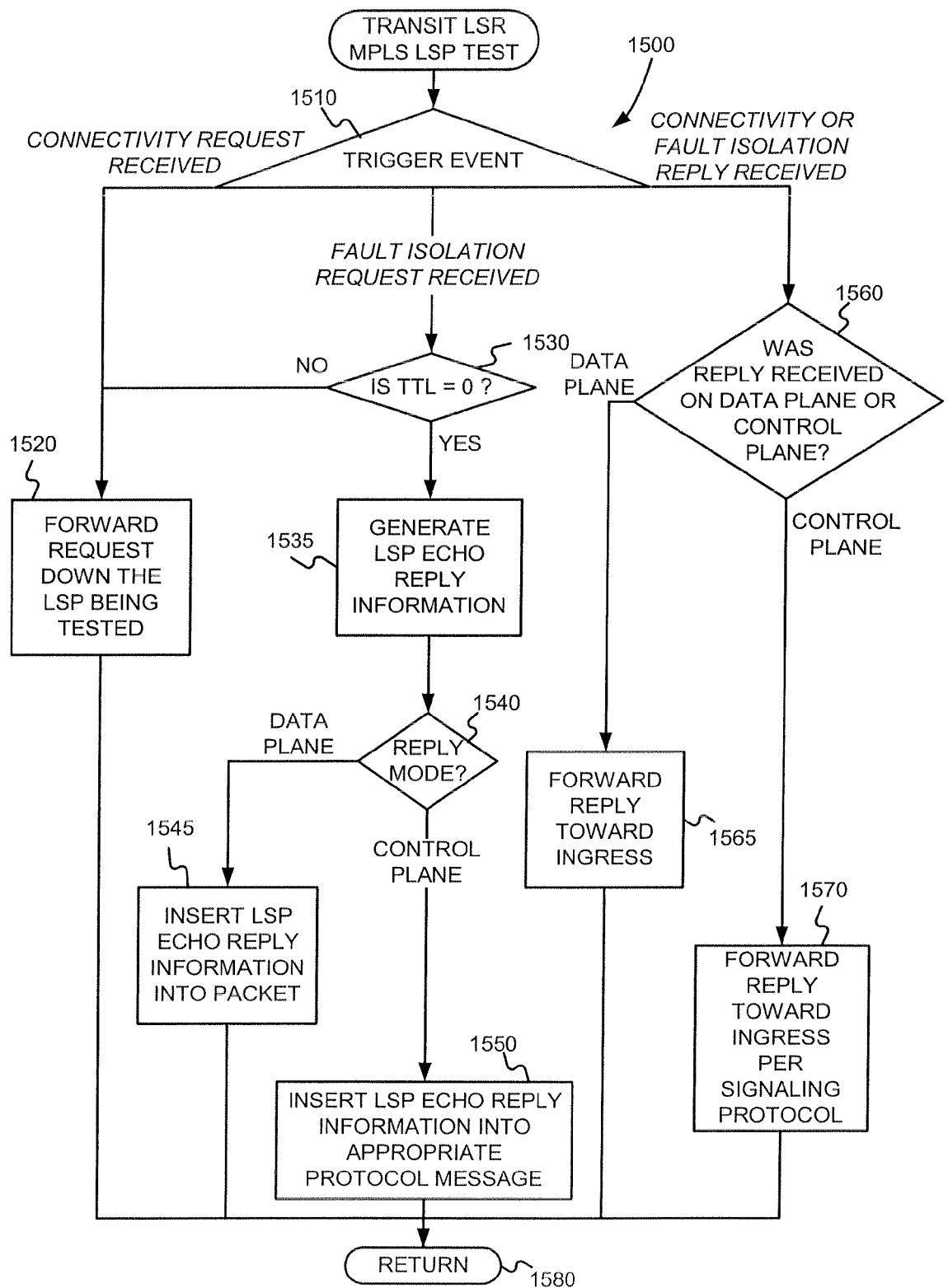
FIG. 15 is a flow diagram of an exemplary method, which may be performed by an intermediate LSR of an LSP, for diagnosing a suspect LSP in a manner consistent with principles of the present invention.

FIG. 15 is a flow diagram of an exemplary method 1500 that may be used to perform the transit LSR MPLS LSP test operations 376 in a manner consistent with principles of the present invention. Various branches of method 1500 may be performed in response to various events (trigger block 1510). More specifically, if a connectivity echo request is received, the transit LSR simply forwards the request down the LSP being tested (act 1520) before method 1500 is left (node 1580).

Referring back to trigger event block 1510, if a fault isolation request is received, it is determined whether or not the TTL field (or hop count) of the packet is zero (act 1530). If not, the request is simply forwarded down the LSP being tested (act 1520) before method 1500 is left (node 1580). If, on the other hand, the value in the TTL field is 0, then LSP echo reply information (object) is generated (act 1535). This information should include downstream mapping information, as described above. Then, the reply mode is determined (decision 1540). If the reply mode is via the data plane, the LSP echo reply information is inserted into a (UDP) packet (act 1545) before method 1500 is left (node 1580). The packet may include a "router alert" option set in its header, depending on the reply mode. Referring back to decision 1540, if the reply mode is via the control plane, the LSP echo reply information (object) is inserted into an appropriate protocol message (act 1550) (Recall, acts 1360, 1375 and 1390 of FIG. 13.) before method 1500 is left (node 1580).

Once again referring back to trigger 1510, if a connectivity or fault isolation test reply is received, it is determined whether or not is was received on the data plane or the control plane (decision 1560). If it was received on the data plane, the reply is forwarded toward the ingress LSR, preferably with priority (act 1565), before method 1500 is left (node 1580). Referring back to decision 1560, if the connectivity or fault isolation reply is received on the control plane, the reply is sent towards the ingress LSR, preferably with priority, per the control plane protocol (act 1570), before method 1500 is left (node 1580).

§4.4.4 Non-Compliant Routers

If the egress LSR for the FEC Stack being tested does not support these connectivity and/or fault isolation tests, then nothing can be done. In fault isolation mode, if a transit LSR does not support this test, then no reply will be forthcoming from that LSR for some TTL, say n. In one embodiment, the LSR originating the echo request should try sending the echo request with TTL=n+1, n+2, . . . , n+k in the hope that some transit LSR further downstream may support MPLS fault isolation echo request and reply. In such a case, the fault isolation echo request for TTL>n should not have Downstream Mapping TLVs, until a reply is received.

§4.5 An Example Illustrating Operations of an Exemplary Embodiment

The following is an example illustrating an exemplary embodiment of the present invention. Consider an LSP between an ingress LSR and an egress LSR spanning multiple LSR hops.

At the Ingress LSR

Before initiating a liveliness test consistent with the teachings of the invention, it should be verified that both the ingress LSR and egress LSR can support MPLS ping.

When an LSP is to be tested, using the teachings of the invention, the ingress LSR may send known MPLS echo request messages over the LSP periodically. The period may be controlled by a timer. The value of the time interval should be configurable. Note that if there are multiple LSPs between the ingress and egress LSRs, the MPLS echo request messages may be differentiated by using unique identifiers in the Identifier field or by using unique source port numbers in the IP header of the echo request message.

If the ingress LSR does not receive MPLS echo reply messages from the egress LSR for a long period of time, there may be a failure (a) on the LSP from the ingress LSR to the egress LSR, (b) on the reverse path (from egress to ingress), or (c) both.

To distinguish between a failure in the forward path (the MPLS LSP path being 'pinged') and a failure in the return path, the present invention uses a return path presumed to be reliable. For example, it is assumed that the IP control and data planes are reliable. If, however, the forwarding in the return path is itself via an MPLS LSP, such reliability cannot be presumed. A potentially unreliable return path can be avoided, consistent with the present invention in one of two ways. First, the Router Alert option may be set in the MPLS echo reply. When a router sees this option, it will forward the packet as an IP packet, thereby avoiding a potentially unreliable return path. Second, the echo reply may be sent via the control plane.

When the ingress LSR suspects that the LSP may have failed (e.g., due to a failed MPLS echo request test), but the signaling (e.g., RSVP, LDP, BGP, etc.) control plane indicates that the LSP is operational, the ingress LSR may send one or more MPLS echo request messages to the egress over the LSP with a notation that the reply should be sent over the control plane. A method for sending replies over an RSVP control plane is described in U.S. patent application Ser. No. 10/179,927, entitled "DETECTING DATA PLANE LIVELINESS IN CONNECTIONS SUCH AS LABEL-SWITCHED PATHS", filed on Jun. 25, 2002 and listing Ping Pan and Nischal Sheth as inventors (Referred to as "the Pan application" and incorporated herein by reference.).

At an Egress LSR

When the egress LSR receives an MPLS echo request that indicates that the reply should be sent over the control plane, it determines which control plane (e.g., BGP, LDP, or RSVP) was used to set up the LSP being tested, and sends a reply indicating the status of the LSP via that control plane. As an example, if the control plane in question is RSVP, the methods described in the Pan application can be used to send the reply.

§4.6 Conclusions

As can be appreciated from the foregoing disclosure, the invention discloses apparatus, data structures and methods for determining whether the data plane of an LSP from an ingress LSR to an egress LSR is functioning properly. Such a determination may be made because the return path used is presumed to be reliable. The invention also discloses apparatus, data structures and methods for isolating a failure in an LSP when it is determined that the LSP is not functioning properly.

It should be understood that other embodiments consistent with the principles of the invention may also be implemented without departing from the spirit and scope of the invention. For example, the invention could be restricted to always use a reliable data plane (or alternative, to always use the control plane) as the reverse channel for carrying the MPLS echo reply. In such an embodiment the MPLS echo request information could be simplified (no return code would be needed) and processing at the egress LSR (and transit LSRs) could be simplified.

What is claimed is:

1. For use with an ingress node of an established label-switched path, a method for testing liveness of the established label-switched path comprising:
 a) generating information related to requesting a reply from a downstream node on the established label-switched path, wherein the information identifies a relationship between the downstream node and the established label-switched path to enable the downstream node to determine if its identifier matches a node identifier in downstream mapping information included in the generated information;
b) inserting the generated information into a request message;
c) forwarding the request message over the established label-switched path;
d) determining whether or not a reply to the request message is received within a predetermined time; and
e) if no reply to the request message is received within the predetermined time, concluding that the established label-switched path is not functioning and implementing a first responsive policy.

2. The method of claim 1 further comprising:
f) if a reply to the request message is received within the predetermined time, then
   i) examining information inserted into the reply by a replying downstream node, and
   ii) if the information inserted into the reply indicates a problem with the established label-switched path, then implementing a second responsive policy.

3. The method of claim 1 wherein the generated information specifies one of a connectivity test mode and a fault isolation test mode.

4. The method of claim 1 wherein the generated information further enables the downstream node to check whether a downstream label in the request message matches a forwarding equivalency class label that the downstream node set as its mapping for the established label switched path.

5. The method of claim 1 wherein the first responsive policy includes at least one of (A) isolating a point of failure in the established label-switched path, and (B) determining a new label-switched path subject to a constraint of avoiding a point of failure isolated in the established label-switched path.

6. The method of claim 1 wherein the generated information includes a unique identifier such that a reply to the request message can be associated with the request message.

7. The method of claim 6 wherein the unique identifier includes at least one of a sequence number and a time stamp.

8. For use with an ingress node of an established label-switched path, apparatus for testing liveness of the established label-switched path comprising:
a) a test facility for
   i) generating information related to requesting a reply from a downstream node on the established label-switched path, wherein the information identifies the established label-switched path being tested to enable the downstream node to determine if its identifier matches a node identifier in downstream mapping information included in the generated information, and
   ii) inserting the generated information into a request message;
b) a forwarding engine for forwarding the request message over the established label-switched path; and
c) a diagnostic facility for
   i) determining whether or not a reply to the request message is received within a predetermined time; and
   ii) if no reply to the request message is received within the predetermined time, concluding that the established label-switched path is not functioning and implementing a first responsive policy.

9. The apparatus of claim 8 wherein the diagnostic facility is further adapted for
iii) if a reply to the request message is received within the predetermined time, then
   A) examining information inserted into the reply by a replying downstream node, and
   B) if the information inserted into the reply indicates a problem with the established label-switched path, then implementing a second responsive policy.

10. The apparatus of claim 8 wherein the generated information specifies one of a connectivity test mode and a fault isolation test mode.

11. The apparatus of claim 8 wherein the generated information further enables the downstream node to check whether a downstream label in the request message matches a forwarding equivalency class label that the downstream node set as its mapping for the established label switched path.

12. The apparatus of claim 8 wherein the generated information specifies one of a data plane return path and a control plane return path to be used by the reply.

13. The apparatus of claim 8 wherein the first responsive policy includes at least one of (A) isolating a point of failure in the established label-switched path, and (B) determining a new label-switched path subject to a constraint of avoiding a point of failure isolated in the 1 established label-switched path.

14. For use with a node, a method for replying to a request related to testing liveness of an established label-switched path, the method comprising:
a) generating information related to replying to the request from an upstream node on the established label-switched path, the information including an indication of a relationship between the node and the label-switched path being tested and including a return code indicating a least one of (1) that the replying node is an egress for the established label switched path, (2) that the replying node has no mapping for the established label switched path, (3) that the replying node is not one of a set of downstream routers included the request, (4) that the replying node is one of the downstream routers included in the request, and its mapping for the established label switched path on the received interface matches a given label, or (5) that the replying node is one of the downstream routers included in the request, but its mapping for the established label switched path is not the given label;
b) inserting the generated information into a reply message; and
c) forwarding the reply message, back to a node that sourced the request, over a path or route other than the established label-switched path.

15. The method of claim 14 wherein the information generated includes an identifier of the established label-switched path.

16. The method of claim 14 further comprising:
checking a hop count of the request; and
if the hop count is a predetermined value, then determining immediately adjacent downstream nodes on the established label-switched path, wherein the information generated includes an indication of the immediately adjacent downstream nodes.

17. For use with a node, apparatus for replying to a request related to testing liveness of an established label-switched path, the apparatus comprising:
a) a test facility for
   i) generating information related to replying to the request from an upstream node on the established label-switched path, the information including an indication of a relationship between the node and the established label-switched path being tested and including a return code indicating a least one of (1) that the replying node is an egress for the established label switched path, (2) that the replying node has no mapping for the established label switched path, (3) that the replying node is not one of a set of downstream routers included the request, (4) that the replying node is one of the downstream routers included in the request, and its mapping for the established label switched path on the received interface matches a given label, or (5) that the replying node is one of the downstream routers included in the request, but its mapping for the established label switched path is not the given label, and ii) inserting the generated information into a reply message; and b) a forwarding engine for forwarding the reply message, back to a node that sourced the request, over channel other than the established label-switched path.

18. The apparatus of claim 17 wherein the information generated includes an identifier of the established label-switched path.

19. The apparatus of claim 17 further comprising:

means for checking a hop count value of the request; and a control facility for determining immediately adjacent downstream nodes on the established label-switched path if the hop count value is a predetermined value, wherein the information generated includes an indication of the immediately adjacent downstream nodes.

\* \* \* \* \*